United States Patent Office 3,107,698
Patented Oct. 22, 1963

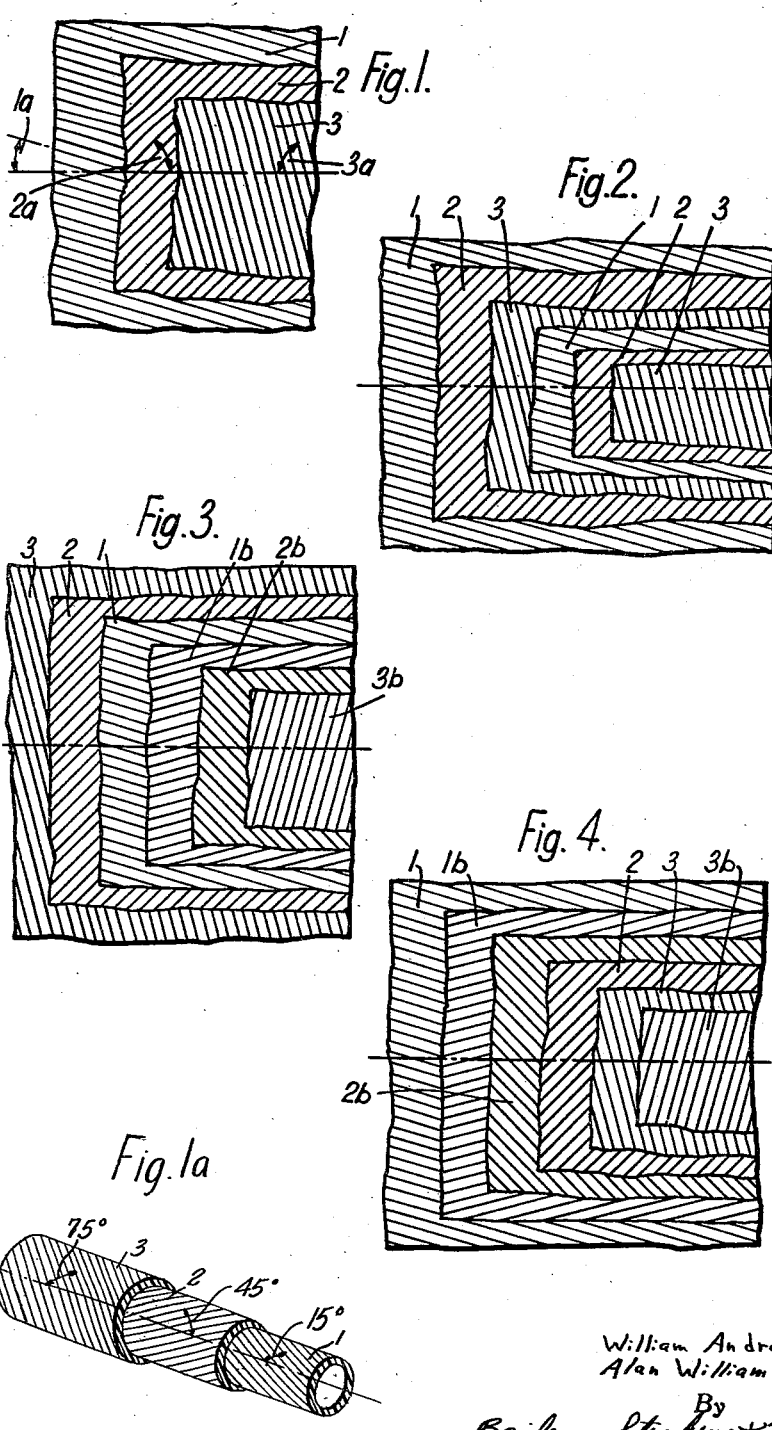

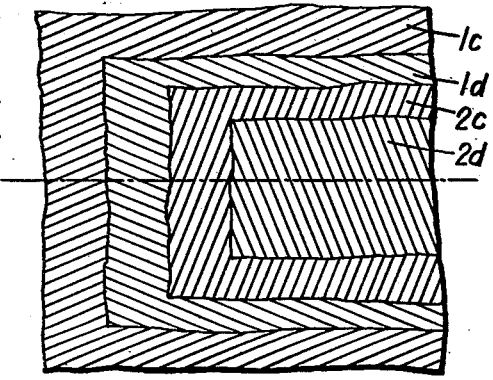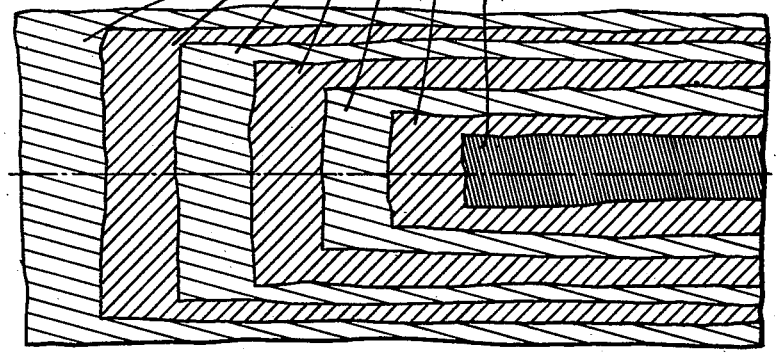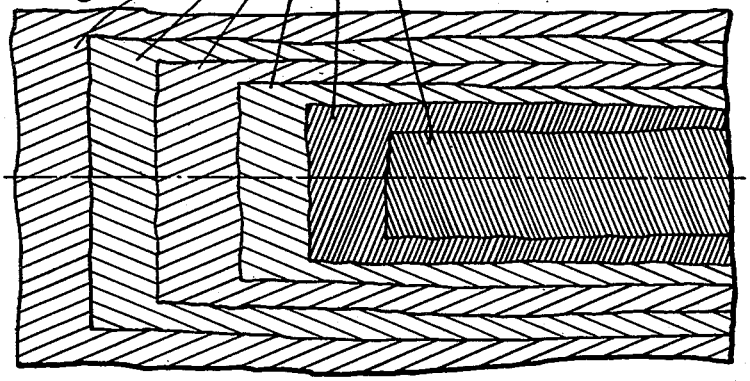

1

3,107,698
PIPES
William Andrew Baker and Alan William Thompson, Bristol, England, assignors, by mesne assignments, to Bristol Aeroplane Plastics Limited, Bristol, England
Filed Mar. 4, 1959, Ser. No. 797,117
Claims priority, application Great Britain Mar. 10, 1958
14 Claims. (Cl. 138—139)

This invention relates to pipe of circular or approximately circular cross section, at least a major part of the wall of which is composed of a plurality of layers of substantially helical turns of thread, the threads of successive layers crossing one another, and the turns and layers being bonded together with a solid resinous substance. The term "thread" as used herein is intended to include multi-fibre roving, spun yarn and single filament thread-like materials and the term "layer" is intended to mean a complete covering of the surface upon which the thread is laid, substantially without spaces between the turns constituting the layer.

The strength of the wall of pipe made in this way with respect to a particular system of stresses parallel to the wall is dependent upon the helix angle which the threads make to the axis of the pipe. Thus, for example, by having an even number of layers each wtih a helix angle of about 55°, alternate layers being of opposite hand, one can obtain a pipe which is twice as strong in relation to hoop stresses as it is in relation to longitudinal stresses, when both stresses are applied simultaneously. This arrangement is ideal for the case of a straight pipe with closed ends loaded by internal pressure, but such loading is not general in pipework installations. A pipe may for example be clamped at intervals to a rigid base so that the longitudinal pressure loading is taken by the base, but in that case change of temperature may produce stresses in the pipe which can exceed the hoop stresses. Such temperature stresses are frequently alleviated by including bends in the pipe, and in such cases the pipe in and adjacent the bends will have a bending moment superimposed upon its other loads which may produce high local stresses. It is also possible for high local stresses to be produced in a pipe by movements in an emplacement, for example ground in which the pipe is buried. For these reasons it is most economical of material for pipe for general use to be so constructed that the wall has approximately the same strength in relation to a stress in any single direction parallel to the surface of the wall.

To achieve this result to a sufficient degree of approximation it is necessary to have at each part of the wall threads extending in at least three different directions. Since the application of layers of thread extending longitudinally or circumferentially of the pipe involves the use of techniques which differ considerably from those most conveniently used for applying layers having an appreciable helix angle, it is undesirable to combine the two, and the use of longitudinally or circumferentially extending threads is therefore excluded in pipes according to this invention.

According to the invention pipe of substantially circular cross section has a wall at least a major part of which is composed of at least three layers of substantially helical turns of thread, the threads of successive layers crossing one another and the turns and layers being bonded together wtih a solid resinous substance, the helix angles and hands of the threads in the layers being such that in any small area of the said major part of the wall of the pipe there are threads extending in at least three different directions, the directions and the numbers of threads extending in these directions being such that the small area of the wall has about the same strength in all directions parallel to the surfaces of the elementary part by the term "small area" we mean a section of the pipe cut out by a cylinder having its axis intersecting the pipe axis and of substantially less diameter than the diameter of the pipe.

According to a first embodiment, in a pipe according to the invention and comprising in its wall three, or a multiple of three, layers of thread, each layer containing about the same amount of thread, the layers are of three different helix angles, preferably about 15°, 45° (opposite hand) and 75°.

According to a second embodiment, in a pipe according to the invention and comprising in its wall four, or a multiple of four, layers of thread, each layer containing about the same amount of thread, the layers are of two different helix angles, preferably about 22½° and about 67½°, each helix angle applying to two layers of opposite hand.

In each of the embodiments referred to above each layer is to contain about the same amount of thread. This entails that the number of threads in each layer varies as the cosine of the helix angle, but it is often more convenient, especially when making pipes of large diameter and therefore requiring a very large number of threads in each layer, to use the same number of threads in each layer, in which case the thickness of the layer, and therefore the amount of thread used in making a given area of it, varies as the secant of the helix angle. In such cases the relative lack of material in the layers of smaller helix angle can be corrected approximately by multiplying the number of layers of smaller helix angle by suitable factors.

A third embodiment of the invention accordingly consists in a pipe according to the invention and comprising in its wall seven, or a multiple of seven, layers of thread, each layer containing the same number of threads, three of the layers being of one hand and having a helix angle of about 15°, three being of the opposite hand and having a helix angle of about 45° and one being of said one hand and having a helix angle of about 75°.

A fourth embodiment similarly consists in a pipe accordingly to the invention and comprising in its wall six, or a multiple of six, layers of thread, each layer containing the same number of threads, two of the layers of each hand having a helix angle of about 22½° and one of each hand having a helix angle of about 67½°.

Where pipe according to any of these embodiments comprises in its walls multiples of the minimum number of layers, the sequence of helix angles used in a first group may repeat in a subsequent group or be reversed in a subsequent group, or all the layers having the same helix angle may lie adjacent to one another but being alternately of opposite hand.

Since the multiplication factors used in the third and fourth embodiments for compensating the thickness of the layers cannot achieve exact compensation, there is a residual error in respect of the amount of thread extending in each of the several directions relatively to the mean obtained by dividing the whole amount of thread by the number of directions. In the case of the third embodiment there is a deficiency of 16.9% wound at a helix angle of 15°, an excess of 13.5% at the helix angle of 45° and an excess of 3.4% at the helix angle of 75°. In the fourth embodiment the error is 9.4% at each helix angle, being a deficiency at the helix angle of 22½°, and an excess at the helix angle of 67½°. The fourth embodiment is therefore at least as good as the third from this point of view and has the advantage of requiring only one change of helix angle instead of two. By adjusting the helix angle of a winding the error due to quantity of thread may be reduced, but at the same time an error due to wrong orientation is introduced and progressively increases. Thus an optimum result can be obtained by a suitable adjustment of the helix angle, and the qualification "about" which has been applied to the specific helix angles quoted is to be understood as providing sufficient scope for such adjustments.

More especially in the third and fourth embodiments it is furthermore desirable to use thread in the form of roving, by which is meant a multi-fibre thread of loose construction such that its cross section is easily distortable. With thread of this kind it is possible to wind layers of single thread thickness and of appreciably different helix angles with the same number of threads without spaces occurring between adjacent turns since, on reaching the mandrel, or when a subsequent layer is applied, the width of the threads accommodates itself within an appreciable range to the space available. When a layer more than one thread thick is wound in a single pass there is a tendency for the winding to become uneven due to the relative positioning of individual threads changing, but a certain amount of latitude in that respect can be tolerated and it is not to be understood that the invention is limited to the use of layers which are one thread thick.

In pipes according to the invention the layers are furthermore preferably arranged with the, or a, layer having the greatest helix angle on the outside. In this way there is obtained during the making of the pipe increased consolidation of the under layers against the mandrel or other support on which the thread is wound for a given permissible tension of the thread during winding.

The thread used for the strength-providing layers of pipe according to the invention is preferably composed of glass fibres, while the bonding resinous substance is preferably an epoxide or a polyester resin.

Since these constituents do not provide a wall material which is sufficiently resistant to corrosion and erosion for some purposes, pipe according to this invention may comprise on one or both sides of its wall a surface layer of a material which is more resistant to these destructive effects. More particularly, for this purpose, pipe according to the invention may comprise on one or both sides of its wall a surface layer of an epoxide resin reinforced with a synthetic organic fibre, for example acrylic fibre or a polyamide fibre. Such additional surface layers do not contribute much to the strength of the pipe and may be ignored in designing the arrangement of the glass fibre layers or may be used to reduce the residual error due to the amount of thread per layer varying with the helix angle.

The invention is illustrated in the accompanying drawings in which FIGS. 1 to 7 each represents diagrammatically a piece of the wall of a pipe which has been flattened and has had parts of the layers of thread broken away to show the arrangement of the threads in the underneath layers, and FIG. 1a shows in perspective a part of a pipe formed of the material of FIG. 1. In each of FIGS. 1 to 7 a chain-dotted line indicates the axial direction of the pipe.

In the embodiment shown in FIGURE 1 the wall of the pipe comprises three layers of thread 1, 2 and 3 respectively, the thread being preferably roving composed of glass fibres. The layer 1 is on the inside and is composed of helical turns having a helix angle 1a of about 15°. The next layer 2 is of opposite hand and has a helix angle 2a of about 45°. The outside layer 3 is again of the original hand and has a helix angle 3a of about 75°. It will be appreciated that with this arrangement the angular intervals between the three thread directions are the same and equal to about 60°, while the threads of the layers 1 and 3 are at equal angles of about 15° to the axial and circumferential directions. The numbers of threads used in winding the layers are proportional to the cosines of the helix angles. Pipe of this design is conveniently made by moving a mandrel endwise and coaxially through three rotating creels each carrying the appropriate number of spools of thread to wind one of the layers completely at one pass. The directions of rotation and the rotational speeds of the creels are maintained in proper relation to the axial speed of the mandrel so as to wind the threads with the required hands and helix angles. The bonding substance, which may be for example a resin of the polyester, epoxide or phenol formaldehyde types, may be applied to each thread individually as it approaches the mandrel, or it may be applied progressively to the partially completed winding or subsequently to the wholly completed winding while the latter is still on the mandrel. In some cases it is alternatively possible to apply a resin in liquid state to the thread, partially polymerise the resin to a dry state so that the thread can be wound upon the supply bobbins for mounting on the creel, and then wind the thread upon the mandrel. In any case, when the winding has been completed it will be necessary to establish conditions appropriate for fully curing the bonding substance. These processes of applying and curing a bonding substance are well known in the art and further description of them is not considered necessary. After the bonding substance has been cured the mandrel may be removed, or in some cases it may be retained as part of the pipe.

When sufficient strength is not obtained by means of a three-layer construction as shown in FIGURE 1, a multiple of three layers may be applied in substantially the same way. FIGURE 2 shows a six-layer construction in which three layers 1, 2 and 3 as in FIGURE 1 are followed by a repeat of the same arrangement. Pipe of this construction can, for example, be made in the way already described by passing the mandrel twice in the same direction through the rotating creels.

FIGURE 3 shows a variation in which the order and hand of the second three layers 1b, 2b and 3b is reversed relatively to that of the first three layers. Also, in order to keep a layer having the greatest helix angle on the outside, so that the underneath layers are most strongly compressed thereby, the order of the first three layers has been reversed to 3, 2, 1. Pipe of this construction can be made in the manner described for that of FIGURE 1 by passing the mandrel back in the reverse direction through the rotating creels, and it has the advantage over the arrangement of FIGURE 2 that the process can be continued uninterruptedly until a desired number of layers has been applied. In performing this process it is of course necessary that the rotating creels should continue to rotate in their original directions when the direction of movement of the mandrel is reversed. It is also advantageous that the rotational speeds of the creels should not fall below a selected minimum during the reversal of direction of the mandrel, so that the threads are always maintained under tension. This also results in the pipes being formed with thickened end portions. These end portions may be discarded or may be adapted, for example by machining, to form end attachments. Apparatus and methods for maintaining the rotational speed of the creels at reversal are the subject of our application No. 797,449, filed March 5, 1959, now Patent No. 3,032,461.

FIGURE 4 shows another variation in which six layers are wound with the pairs of layers of the same helix angle but opposite hand adjacent one another. Using the same notation as before the order thus becomes 1, 1b, 2b, 2, 3, 3b.

FIGURE 5 shows a four-layer arrangement using only two different helix angles. A first layer 1c is wound with a helix angle of about 22½° and is followed by a second layer 1d of the same helix angle but opposite hand. The hand of the next layer 2c is again reversed and its helix angle is increased to about 67½°. The final layer 2d has the same helix angle of 67½° but is again of opposite hand. It will be appreciated that this arrangement gives equal angular differences of 45° between the threads in the layers 1c, 1d; 1d, 2d; 2d, 2c; 2c, 1c, and also equal angles between the axial and circumferential directions and the respective helices nearest thereto.

FIGURE 6 shows an example of the arrangement previously referred to as the third embodiment and suitable for use when all the layers are required to comprise the same number of threads so that a single creel of thread bobbins can be used, the mandrel and frame being reciprocated relatively to one another and the speed ratio being changed to change the helix angle of the winding when required. In this case there is an added requirement that successive layers must be of opposite hand, and again, relative rotation is prevented from falling below a minimum value necessary to maintain tension on the threads during the reversals. Naturally, in carrying out this process either the mandrel or the creel may be reciprocated and either the mandrel or the creel may be rotated.

In the arrangement of FIGURE 6 there are three layers with a helix angle of about 15°, three with a helix angle of about 45° and one with a helix angle of about 75°. The first, third and fifth layers 11, 13 and 15 are composed of right hand 15° helices, the second, fourth and sixth layers 12, 14 and 16 are composed of left hand helices, and the seventh layer 17 is composed of right hand 75° helices. When making pipe comprising multiples of this seven-layer arrangement various rearrangements are possible in the manner explained in connection with FIGURES 2, 3 and 4.

FIGURE 7 shows an example of the arrangement previously referred to as the fourth embodiment, in which, again, all layers comprise the same number of threads. In this arrangement there are two layers of each hand with a helix angle of about 22½° and one layer of each hand with a helix angle of about 67½°. It is therefore convenient to group all the layers of the same helix angles together, those with the larger helix angle being on the outside. The arrangement thus comprises first and third layers 21, 23 composed of left hand 22½° helices, second and fourth layers 22, 24 composed of right hand 22½° helices, a fifth layer 25 composed of left hand 67½° helices, and a sixth layer 26 composed of right hand 67½° helices. This arrangement is particularly convenient since it involves only one change of helix angle, and the same can apply to arrangements using multiples of this six-layer arrangement if all the layers having the same helix angle are grouped together.

We claim:

1. A pipe of substantially circular cross-section consisting essentially of at least three layers of substantially helical turns of thread, the threads of successive layers crossing one another, a solid resinous substance bonding the threads together, there being in any small area of the wall threads extending in at least three different helical directions, the angular differences between the helical directions measured successively being substantially equal and the numbers of threads in each of the helical directions being substantially proportional to the cosines of the helix-angles of such directions.

2. A pipe according to claim 1 comprising in its wall a number of layers of thread having a factor of three, each layer containing about the same amount of thread, the threads of the layers being wound at three different helix angles.

3. A pipe according to claim 2 in which the helix angles are about 15° and 75° in one helical direction and 45° in the opposite helical direction.

4. A pipe according to claim 1 comprising in its wall a number of layers of thread having a factor of four, each layer containing about the same amount of thread, the threads of the layers being wound at two different helix angles, each helix angle applying to two layers of opposite helical direction.

5. A pipe according to claim 4 in which the helix angles are about 22½° and about 67½°.

6. A pipe according to claim 1 comprising in its wall a number of layers of thread having a factor of seven, each layer containing the same number of threads, three of the layers being of one hand and having threads at a helix angle of about 15°, three being of the opposite hand and having threads at a helix angle of about 45° and one being of said one hand and having threads at a helix-angle of about 75°.

7. A pipe according to claim 1 comprising in its wall a number of layers of thread having a factor of six, each layer containing the same number of threads, two of the layers of each hand having threads at a helix angle of about 22½° and one of each hand having threads at a helix angle of about 67½°.

8. A pipe according to claim 1 containing a multiple of the minimum number of layers, in which the sequence of helix angles used in the threads of an innermost group of layers is repeated in an outer group.

9. A pipe according to claim 1 containing a multiple of the minimum number of layers, in which the sequence of helix angles used in the threads of an innermost group of layers is reversed in an outer group.

10. A pipe according to claim 1 in which all the layers having threads at the same helix angle lie adjacent to one another and are alternately of opposite helical direction.

11. A pipe according to claim 1 in which the threads are of roving.

12. A pipe according to claim 1 in which a layer having threads at the greatest helix angle is on the outside.

13. A pipe according to claim 1 in which the threads are of glass and the resinous substance is a substance selected from the group consisting of epoxide and polyester resins.

14. A pipe according to claim 1 having on at least one side of its wall an additional surface layer of a synthetic organic fibre bonded with an epoxide resin.

References Cited in the file of this patent

UNITED STATES PATENTS

| | | |
|---|---|---|
| 1,011,090 | Subers | Dec. 5, 1911 |
| 2,723,705 | Collins | Nov. 15, 1955 |
| 2,747,616 | De Ganahl | May 29, 1956 |
| 2,791,241 | Reed | May 7, 1957 |
| 2,825,364 | Cullen et al. | Mar. 4, 1958 |
| 2,962,050 | Ramberg et al. | Nov. 29, 1960 |
| 2,969,812 | De Ganahl | Jan. 31, 1961 |

FOREIGN PATENTS

| | | |
|---|---|---|
| 430,668 | Great Britain | June 24, 1935 |